United States Patent
Sipes, Jr. et al.

(10) Patent No.: US 10,151,886 B2
(45) Date of Patent: *Dec. 11, 2018

(54) CONNECTOR ASSEMBLIES FOR HYBRID FIBER/WIRE CONNECTIONS

(71) Applicant: RADIUS UNIVERSAL LLC, Lynbrook, NY (US)

(72) Inventors: Donald Lee Sipes, Jr., Colorado Springs, CO (US); John David Read, Colorado Springs, CO (US)

(73) Assignee: Radius Universal, LLC, Lynbrook, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/728,068

(22) Filed: Oct. 9, 2017

(65) Prior Publication Data
US 2018/0031778 A1     Feb. 1, 2018

Related U.S. Application Data

(62) Division of application No. 15/233,312, filed on Aug. 10, 2016.

(60) Provisional application No. 62/318,333, filed on Apr. 5, 2016.

(51) Int. Cl.
    *G02B 6/38*          (2006.01)
    *G02B 6/42*          (2006.01)
    *H01R 13/516*     (2006.01)

(52) U.S. Cl.
CPC ......... *G02B 6/3817* (2013.01); *G02B 6/3887* (2013.01); *G02B 6/3893* (2013.01); *G02B 6/4292* (2013.01); *G02B 6/4293* (2013.01); *H01R 13/516* (2013.01); *G02B 6/3879* (2013.01); *G02B 6/3897* (2013.01)

(58) Field of Classification Search
CPC .................................................... G02B 6/3817
See application file for complete search history.

(56) References Cited

U.S. PATENT DOCUMENTS

| 4,449,784 | A | | 5/1984 | Basov et al. |
| 5,109,452 | A | * | 4/1992 | Selvin ................. G02B 6/3817 385/56 |
| 5,242,315 | A | | 9/1993 | O'Dea |
| 5,398,295 | A | | 3/1995 | Chang et al. |

(Continued)

FOREIGN PATENT DOCUMENTS

JP         60188912 A    *   9/1985           G02B 6/3817

OTHER PUBLICATIONS

OneReach™—PoE Extender System Brochure, "Take PoE, PoE+, and now High PoE simplicity and gigabit capability to new distances", *Berk-Tek*, (12 pages), publication date unknown.

(Continued)

*Primary Examiner* — Michelle R Connelly
(74) *Attorney, Agent, or Firm* — Leydig, Voit & Mayer, Ltd.

(57) ABSTRACT

A connector assembly for a hybrid cable includes: a housing, comprising a base; at least one discrete connector mounted in the base or at least one connector that is at least partially integrated in the base, configured to receive at least one fiber from the hybrid cable; and at least one electrical interface, configured to receive at least one wire from the hybrid cable.

13 Claims, 11 Drawing Sheets

(56) References Cited

U.S. PATENT DOCUMENTS

| | | | |
|---|---|---|---|
| 5,461,688 A * | 10/1995 | Lee ................ | G02B 6/3817 385/75 |
| 6,931,183 B2 | 8/2005 | Panak et al. | |
| 6,974,262 B1 | 12/2005 | Rickenbach | |
| 7,404,091 B1 | 7/2008 | Gere | |
| 8,430,692 B2 | 4/2013 | Peng et al. | |
| 8,502,733 B1 | 8/2013 | Negus et al. | |
| 8,672,559 B2 | 3/2014 | Wang et al. | |
| 8,935,543 B2 | 1/2015 | Hunter, Jr. et al. | |
| 9,500,812 B2 | 11/2016 | Tanaka et al. | |
| 9,500,815 B2 | 11/2016 | Good et al. | |
| 2001/0016102 A1 | 8/2001 | DeMarchi | |
| 2005/0229016 A1 | 10/2005 | Addy | |
| 2006/0089230 A1 | 4/2006 | Biederman et al. | |
| 2006/0093277 A1 * | 5/2006 | Mulligan ........... | G02B 6/3817 385/75 |
| 2007/0116411 A1 | 5/2007 | Benton et al. | |
| 2009/0175580 A1 | 7/2009 | Chen et al. | |
| 2010/0183262 A1 | 7/2010 | Caveney et al. | |
| 2010/0299544 A1 | 11/2010 | Hansalia | |
| 2010/0319956 A1 | 12/2010 | Ballard et al. | |
| 2010/0325324 A1 | 12/2010 | Aronson et al. | |
| 2011/0229083 A1 * | 9/2011 | Dainese Junior .... | G02B 6/3869 385/74 |
| 2012/0178303 A1 | 7/2012 | Sakurai | |
| 2014/0029899 A1 * | 1/2014 | Isenhour ........... | G02B 6/3829 385/79 |
| 2014/0147080 A1 | 5/2014 | Lambourn et al. | |
| 2015/0003790 A1 * | 1/2015 | Wu .................. | G02B 6/3887 385/81 |
| 2015/0110444 A1 | 4/2015 | Tanaka et al. | |
| 2016/0116685 A1 | 4/2016 | Wong | |
| 2016/0380777 A1 | 12/2016 | Sipes, Jr. et al. | |

OTHER PUBLICATIONS

Article entitled: Fiber Optic Cables, Reels, Converters/Extenders, Breakout Boxes and Rackmount, *Total Fiber Solutions*, www.camplex.com, (2 pages), publication date unknown.

International Search Report and Written Opinion of co-pending International Application No. PCT/US2017/025397 dated Jun. 16, 2017.

Extended EP Search Report for related European Patent Application No. 14846208.8, dated Feb. 6, 2017.

U.S. Appl. No. 15/728,040, filed Oct. 9, 2017.

U.S. Appl. No. 15/728,016, filed Oct. 9, 2017.

U.S. Appl. No. 15/233,312, filed Aug. 10, 2016.

International Search Report for co-pending International Application No. PCT/US2014/056506, dated Dec. 29, 2014 (20 pages).

International Preliminary Report and Written Opinion for co-pending International Application No. PCT/US2014/056506, dated Mar. 31, 2016 (13 pages).

Technical Specification Sheet "PoE Extender over Hybrid Fiber", *Level One*, retrieved from www.level1.com/oneworld_one_brand_one_Level, (3 pages).

Technical Specification Sheet, "Hybrid Fiber Cable, 12/18 AWG", *Level One*, retrieved from www.level1.com/oneworld_one_brand_one_Level, (2 pages).

Data Sheet, "Hybrid Cable Assemblies", *Fiber Connections Inc.*, retrieved from www.fiber.com, DS19-7-2011, (2 pages).

Technical Specification Sheet, Universal Interface Component of TE's Powered Fiber Cable System, retrieved from www.te.com/TelecomNetworks (4 pages) 2014.

Data Sheet, "Ag5700-200W Powered Device Module", V1.2, *Silver Telecom*, Aug. 2012. (14 pages).

"Introduction to Power Over Hdbaset", *HDBaseT Alliance*, 2011, (6 pages).

Brochure entitled "Powered Fiber Cable System", *CommScope*, 2016, (6 pages).

Extended Search Report for related European Patent Application No. 14846208.4, dated Feb. 6, 2017.

* cited by examiner

CONNECTOR ASSEMBLIES FOR HYBRID FIBER/WIRE CONNECTIONS

CROSS-REFERENCE TO RELATED APPLICATIONS

This patent application is a divisional of copending U.S. patent application Ser. No. 15/233,312, filed Aug. 10, 2016, which claims the benefit of U.S. Provisional Patent Application No. 62/318,333, filed Apr. 5, 2016. Both of the aforementioned patent applications are incorporated by reference herein in their entireties.

BACKGROUND

Examples of fiber-based communications networks where hybrid fiber/wire cables are used to deliver data/power, respectively, are described in U.S. patent application Ser. No. 14/490,988, U.S. patent application Ser. No. 14/836,600, and U.S. patent application Ser. No. 14/837,989, which are incorporated herein by reference. The hybrid fiber/wire cables used in these fiber-based communications network include fiber for data communications and wire for power transmission.

In order to facilitate the transmission of both data and power using the hybrid fiber/wire cables, the hybrid fiber/wire cables are connected to end devices or interface devices of the fiber-based communications network. For example, as discussed in U.S. patent application Ser. No. 14/836,600, connections may be achieved through a cabling interface with separate fiber and wire connectors, a dongle wherein the fibers are mechanically spliced, Small Form-factor Pluggable (SFP) cage-based interfaces, and/or a junction box internal or external to an end device or interface device.

SUMMARY

In an exemplary embodiment, the invention provides a connector assembly for a hybrid cable including: a housing, comprising a base; at least one discrete connector mounted in the base, configured to receive at least one fiber from the hybrid cable; and at least one electrical interface, configured to receive at least one wire from the hybrid cable.

In another exemplary embodiment, the invention provides a connector assembly for a hybrid cable including: a housing, comprising a base; at least one connector that is at least partially integrated in the base, configured to receive at least one fiber from the hybrid cable; and at least one electrical interface, configured to receive at least one wire from the hybrid cable.

In yet another exemplary embodiment, the invention provides a connector assembly for a hybrid cable including: a housing adapted to accept the hybrid cable, the housing comprising multiple pathways; wherein the multiple pathways include: a first pathway configured to receive at least one fiber of the hybrid cable; and a second pathway configured to receive at least one wire of the hybrid cable.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Field installation of optical fiber can be a relatively complicated and difficult task, typically requiring the involvement of a technician with the appropriate experience and expertise.

Embodiments of the present invention, however, provide connector assemblies that provide a convenient and effective manner of connecting a hybrid fiber/wire cable to various devices and components of a fiber-based communication system (such as mid span power insertion devices, end devices, and/or interface devices). Once hybrid fiber/wire cables are terminated using embodiments of the connector assemblies discussed herein, everyday users of a fiber-based communication system are able to configure and rearrange hybrid fiber/wire connections in the field without having to involve a specialized technician.

Further, features of the embodiments of the connector assemblies discussed herein provide various advantages with respect to protecting the integrity of the optical fiber, safety with respect to power transmission, cost, and ease of manufacture. Further, by utilizing existing low-cost SFP-type infrastructure and existing standards, low-cost and reliable connections of hybrid fiber/wire cables can be achieved that conform with current multi-source agreements (MSA) and other standards.

Figure 1A:
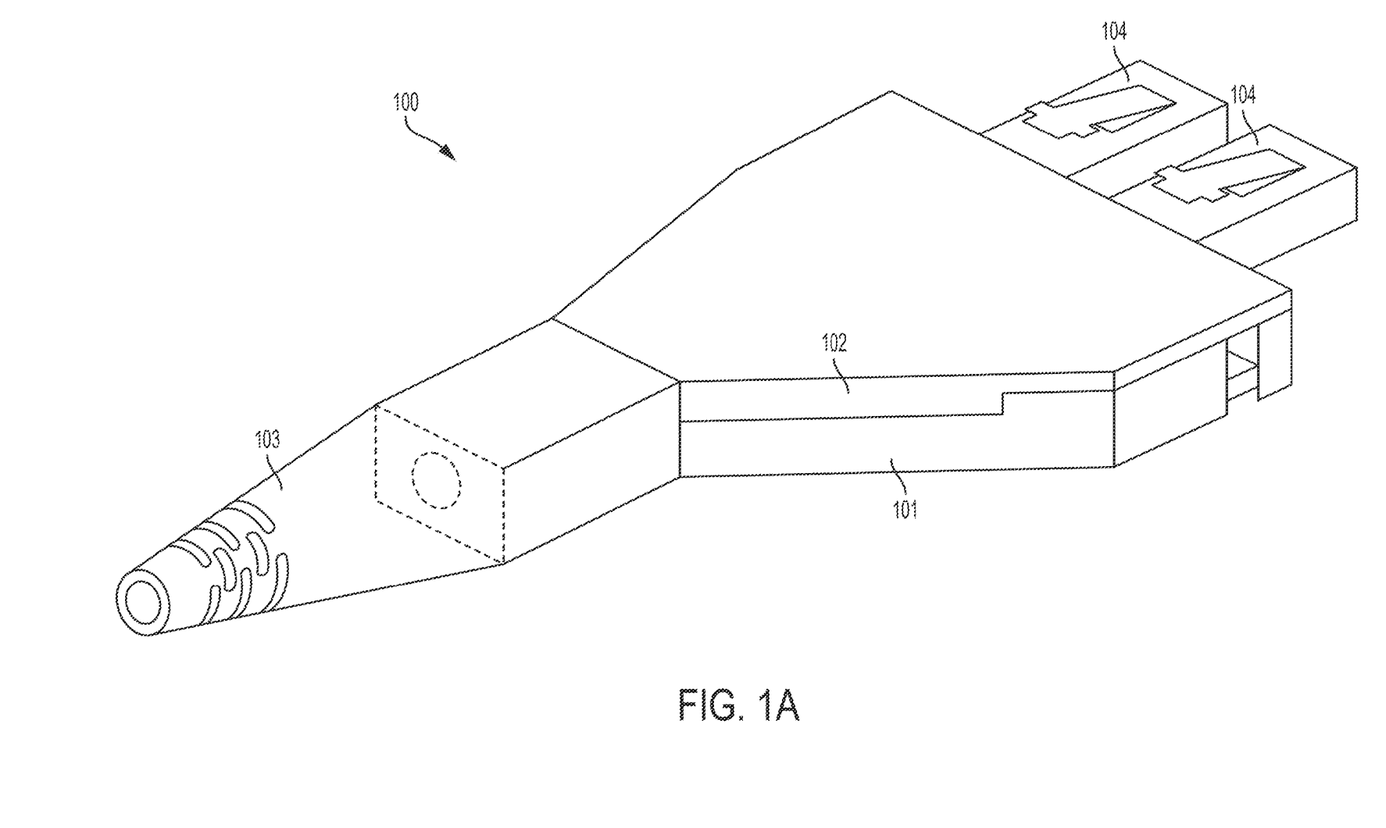
FIGS. 1A-1C are schematic diagrams illustrating an exemplary LC connector assembly utilizing discrete LC connectors.
Figure 1B:
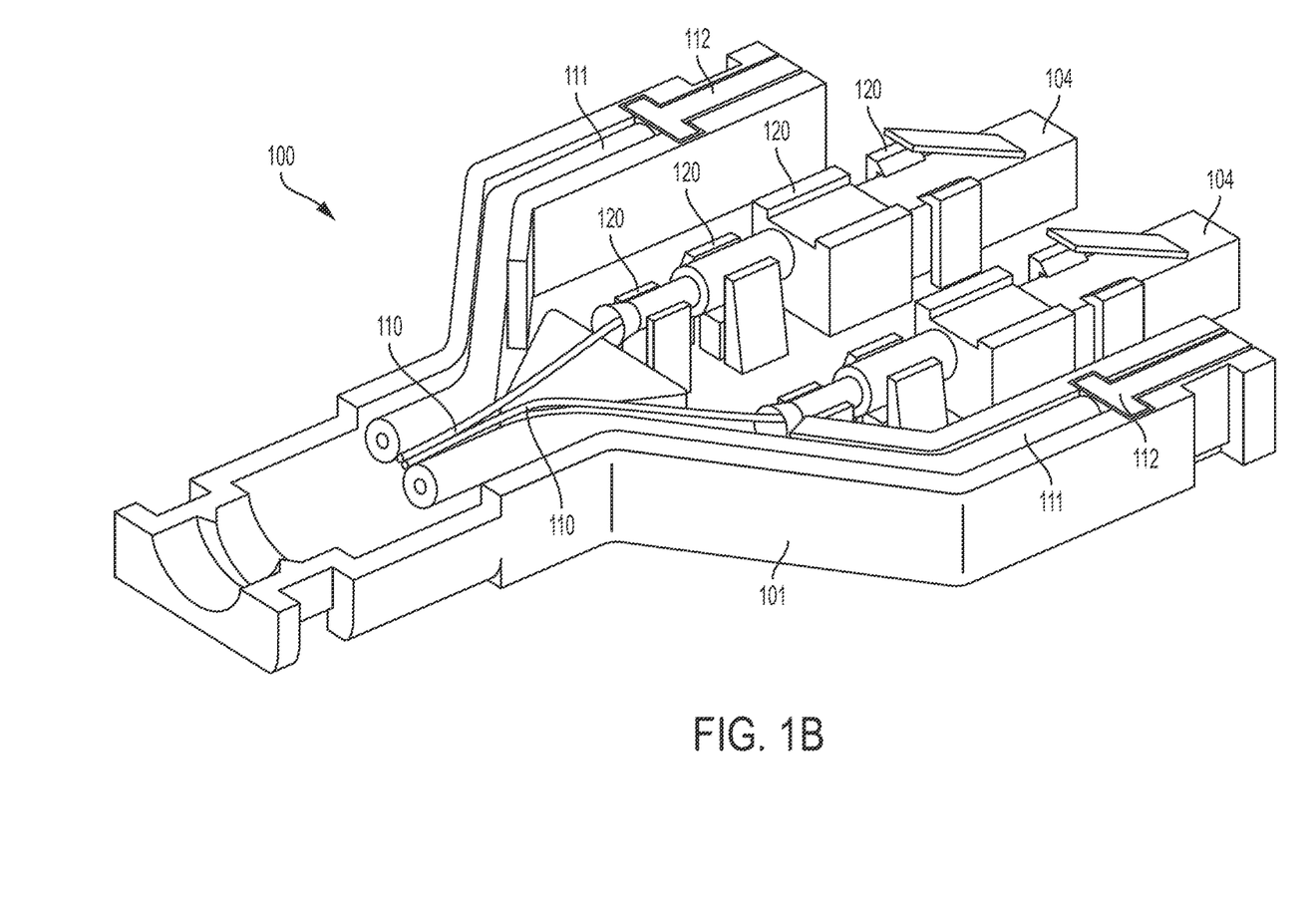
Figure 1C:
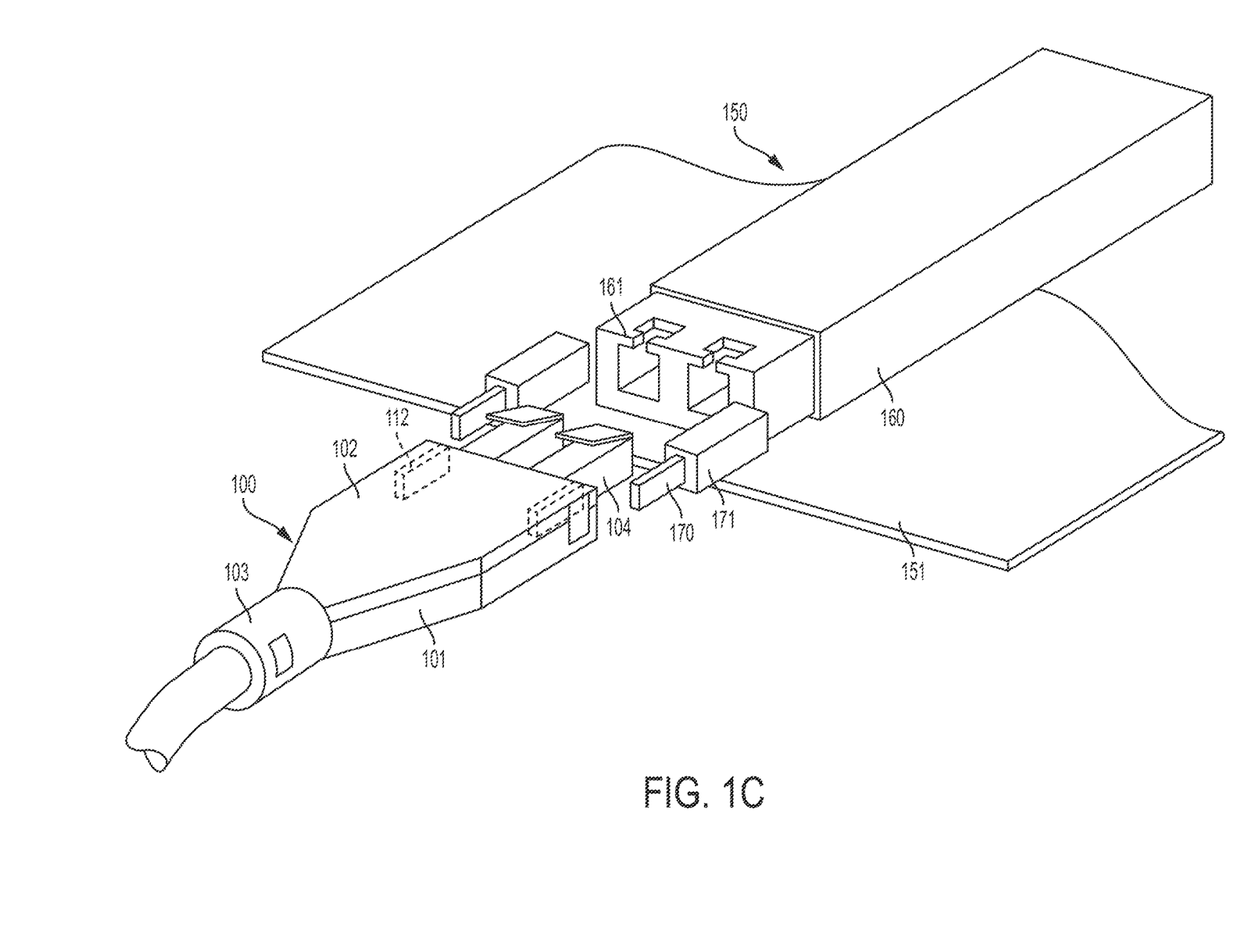

FIGS. 1A-1C are schematic diagrams illustrating an exemplary LC connector assembly 100 utilizing discrete LC connectors. The LC connector assembly 100 utilizes standard LC connectors for terminating fibers of a hybrid fiber/wire cable and power sockets for terminating wires of a hybrid fiber/wire cable.

FIG. 1A is a schematic diagram illustrating LC connector assembly 100 with cover 102 in an assembled position relative to base 101. LC connector assembly 100 further includes a strain relief rubber boot in the neck of the connector assembly 103 that secures a hybrid fiber/wire cable to the connector assembly. The hybrid cable (not depicted) terminated by the LC connector assembly 100 extends out of the strain relief rubber boot. LC connectors 104, which may be standard, commercially-available discrete LC connectors, protrude from the other end of the LC connector assembly and provides an interface for LC-compatible device (e.g., a device having dual LC connector sockets of an SFP cage).

In an exemplary implementation, LC connectors 104 are Corning Opticam field terminate-able LC connectors. In other exemplary implementations, LC connectors 104 may be other types of field terminate-able connectors (e.g., from other vendors) or factory-terminated LC connectors.

In an exemplary embodiment, base 101 and cover 102 may be produced via a molding process and may be made of plastic.

FIG. 1B is a schematic diagram illustrating an expanded view of LC connector assembly 100 with cover 102 removed. FIG. 1B illustrates the positioning of fibers 110 and wires 111 (e.g., copper electrical wires) of an unsheathed portion of the hybrid fiber/wire cable within LC connector assembly 100 (it will be appreciated that the sheathed portion of the hybrid fiber/wire cable is not depicted, which extends out of the neck of the LC connector assembly, is not depicted). Fibers 110 are inserted into LC connectors 104, and the LC connector assembly 100 includes support structures 120 for supporting and holding the LC connectors 104 in place. Wires 111 are inserted into power sockets 112.

In this example, support structures 120 of base 101 have tabs such that LC connectors 104 may be snapped into place and securely held in position relative to one another such that the protruding portions of LC connectors 104 are able to successfully interface with dual LC connector sockets of an SFP cage. Base 101 may further include holding structures, such as grooves, for routing fibers 110 and wires 111 through the LC connector assembly 100.

In one example, to terminate a hybrid fiber/wire cable using LC connector assembly 100, an end of the hybrid fiber/wire cable is stripped of its outside sheath to expose individual fibers 110 and wires 111. The individual fibers 110 and wires 111 are also stripped at the ends to expose the fibers 110 and wires 111. The exposed wires 111 are inserted into power sockets 112 and the exposed fiber is terminated in LC connectors 104. LC connectors 104 are then placed into LC connector assembly 100 into appropriate positions dictated by the support structures 120, and the power sockets 112 are disposed in appropriate positions dictated by the base 101. The corresponding fibers 110 and wires 111 are routed within the LC connector assembly 100 along respective pathways or pairs of pathways (which may be accomplished, for example, by placing wires 111 in corresponding grooves formed in base 101), while an sheathed portion of the hybrid fiber/wire cable is run through the neck 103 of LC connector assembly 100. In this example, wires 111 are routed on a pair of pathways along the outside of base 101 while fibers 110 are routed on a pair of pathways closer to the center of base 101. The cover 102 may be clipped or snapped onto base 101 to secure the fibers 110 and wires 111 into place, and the cover 102 may clamp onto an outer sheath of the hybrid fiber/wire cable at the neck 103 to provide a degree of strain relief to the fibers 110 and wires 111 within LC connector assembly 100. In a further exemplary embodiment, there may be additional structures (not depicted) on the underside of the cover 102 to augment the holding of the components within the LC connector assembly 100 in place.

Support structures 120 may also provide some degree of strain relief, and additional strain relief may be incorporated as well.

It will be appreciated that the length of the stripped off portions of the hybrid fiber/wire cable, the fibers and the wires may vary based on a number of factors, including the nature of the connector (e.g., LC, SC), the size of the connector, etc.

FIG. 1C is a schematic diagram illustrating an exemplary environment in which LC connector assembly 100 is depicted with a device 150 to which LC connector assembly 100 may be connected. Device 150 includes a printed circuit board (PCB) 151. An SFP cage 160 on PCB 151 having a dual SFP socket 161 is configured to interface with LC connectors 104 to provide data communications, while contact blades 170 located in contact blade housings 171 on PCB 151 are configured to interface with power sockets 112 to provide power transmission. The contact blades 170 (which are male electrical connectors mounted on the PCB 151), may be connected to the rest of device 150 through electrically conductive traces on the PCB 151.

The SFP cage 160 and the contact blades 170 may be positioned such that the contact blades 170 interface with power sockets 112 and the dual SFP socket 161 interfaces with LC connectors 104 simultaneously (or near simultaneously) during connection of LC connector assembly 100 to device 150. In an exemplary embodiment, by using a rigid or semi-rigid relationship between the fiber connectors (e.g., LC connectors 104 and SFP cage 160) and the electrical connections (e.g., power sockets 112 and contact blades 170), both the data and power connections may be made at the same time during the mating process and released at the same time during the de-mate process. For example, because the SFP socket 161 and the contact blade housings 171 may be misaligned with respect to each other on the PCB 151, and because the fit of the LC connectors 104 with respect to the SFP socket 161 is a very precise fit (e.g., approximately 1 um tolerance), some flexibility may be provided for the LC connectors 104 with respect to each other, and the SFP cage 160 may have a bevel on a sleeve of the ferrule inputs to guide the LC connectors 104 into place. In another exemplary embodiment, a mechanical delay between completing the fiber connection and completing the wire connection may be achieved by positioning the components so as to cause the respective connections to be made one before the other or one after the other.

In the exemplary embodiment of the LC connector assembly depicted in FIGS. 1A-IC, the electrical connection for power transmission of LC connector assembly 100 are female. In the device to which the LC connector assembly is attached, there exists a corresponding SFP (or SFP+ or QSFP) or SFF module, with the LC connectors in the LC connector assembly being configured to be of the same dimensions as that required by the SFP or SFF module. Further, because of the planar nature of the electrical circuit boards, positive and negative (or ground) electrical connectors are placed on either side of the SFP module (and in this case, the connector assembly, which is providing the power, has female electrical connections and the circuit board, which is receiving the power, has male electrical connections).

It will be appreciated that although the contact blades 170 and power sockets 112 in this example are illustrated with respect to a rectangular blade type configuration, other configurations of the electrical connection for power transmission may be used in other exemplary embodiments. Additionally, it will be appreciated that although the contact blades 170 and power sockets 112 in this example are illustrated as being disposed on either side of LC connectors 104 and SFP cage 160, other configurations, such as having both electrical connections on one side of the SFP cage, or above or below the SFP cage, may be used in other exemplary embodiments.

In the foregoing discussion of FIGS. 1A-IC, base 101 and LC connectors 104 are separate components that are snapped or otherwise affixed together. In another exemplary embodiment, the base of the LC connector assembly and the LC connectors may be integrally formed as a single component from a single plastic mold. In this exemplary embodiment, the ferrule, fiber stub and v-groove components of an LC connector 104 may be placed as inserts in the base of the LC connector assembly having integrated LC connectors.

Figure 2A:
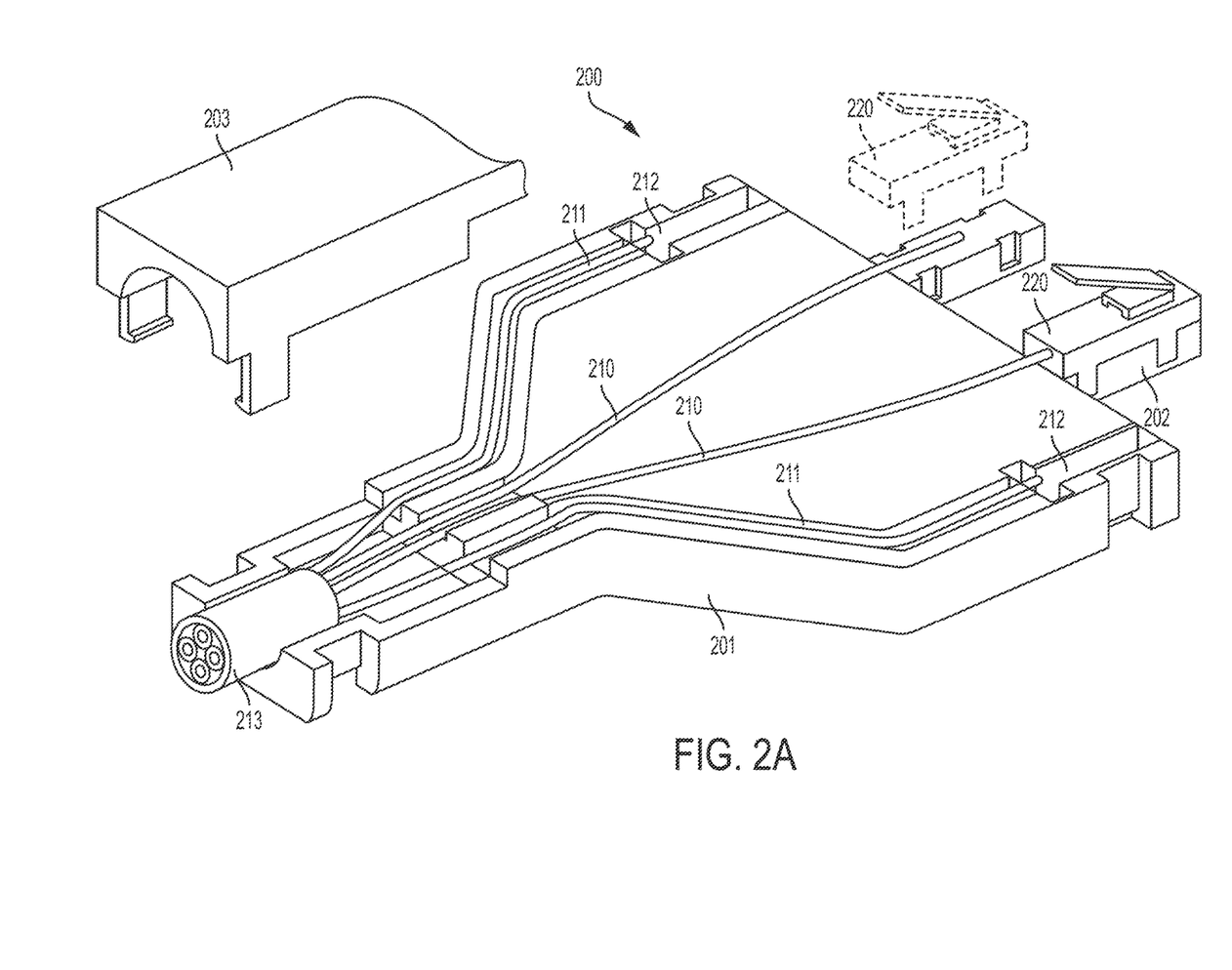
FIGS. 2A-2B are schematic diagrams illustrating an exemplary LC-compatible connector assembly utilizing integrated LC-compatible connectors.
Figure 2B:
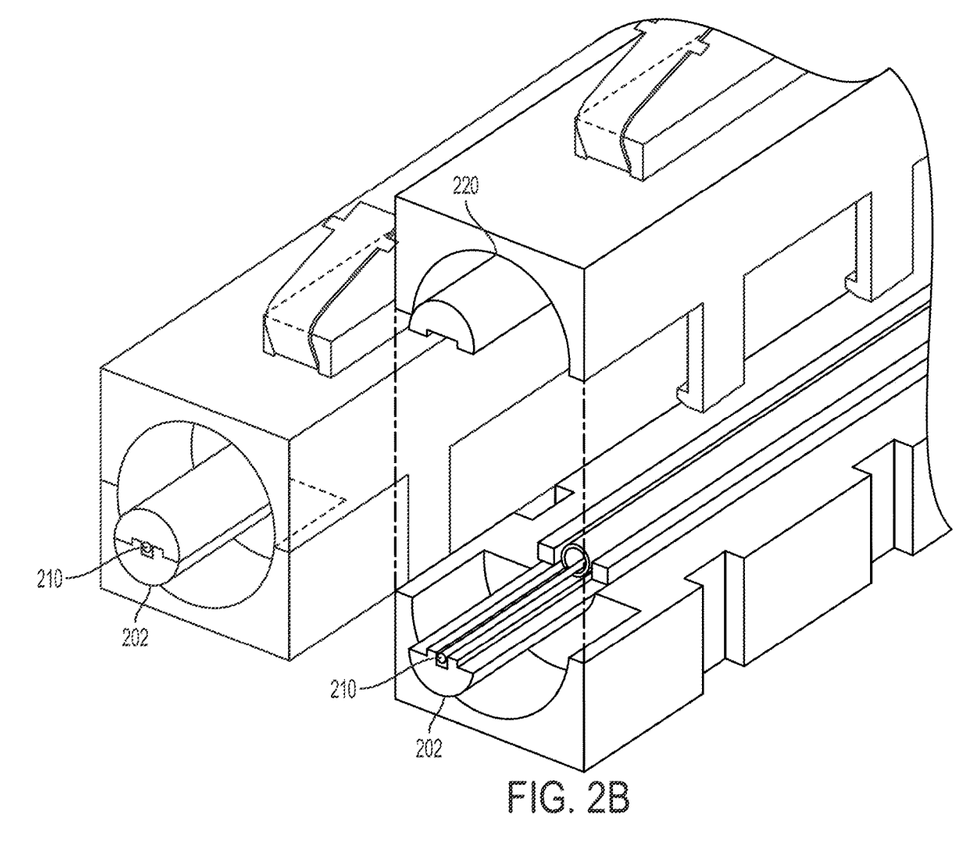

FIGS. 2A-2B are schematic diagrams illustrating an exemplary LC-compatible connector assembly 200 utilizing integrated LC-compatible connectors. As shown in FIG. 2A, connector assembly 200 is similar to LC connector assembly 100 in that it is compatible with an SFP cage having a dual SFP socket configured to interface with two LC connectors, but connector assembly 200 does not include discrete LC connectors. Rather, connector assembly 200 includes fibers 210 which include stripped portions disposed in respective protrusions 202 coming out of base 201. It will be appreciated that since connector assembly 200 does not utilize discrete LC connectors, it may be produced at a lower cost relative to connector assembly 100.

FIG. 2A is a schematic diagram illustrating an expanded view of connector assembly 200 with only a portion of cover 203 shown. The connector assembly 200 includes fibers 210 and wires 211 of a hybrid fiber/wire cable, as well as power sockets 212. The wires 211 are located in grooves in base 201 to the outside of fibers 210, which are disposed in the center of connector assembly 210. The wires 211 and fibers 210 are routed towards the neck of connector assembly 200 where the hybrid fiber/wire cable is sheathed 213. Cover 203, which is not completely shown, may be clipped to base 201 to secure the wires 211 and fibers 210 into place. A strain relief (not depicted) may also be provided in the neck of connector assembly 200 to protect the fibers 210 and wires 211 of the hybrid fiber/wire cable.

FIG. 2A also depicts protrusions 202 coming out of base 201, as well as fiber clamps 220, both in an unclamped position (left side) and a clamped position (right side). FIG. 2B is a schematic diagram illustrating the fiber clamps 220 and the protrusions 202 in more detail, as well as the configuration of the fibers 210 on the protrusions 202. As shown in FIG. 2B, the fibers 210 are cleaved at an appropriate length such that an end of the bare portion of fiber 210 matches up with an end of protrusion 202. Further, the connector assembly 200 is split in such a way to allow for the fibers 210 with bare portions to be inserted and held in a plastic two-piece ferrule (formed by the combination of a clamp 220 and a protrusion 202) that is compatible with SFP type modules—i.e., respective fiber clamps 220 are clamped down on protrusions 202 to securely hold the fibers 210 into place, and the clamped structure provides an SFP-compatible interface. The fiber clamps 220 may be part of cover 203 or may be standalone components.

The right side of FIG. 2B shows a cleaved fiber 210 with a bare portion disposed in a protrusion 202. The fiber 210 is cleaved by standard methods, and the fiber 210 is inserted at and/or adjusted to be in a proper position such that the bare portion reaches the end of the protrusion 202. In an exemplary implementation, the end of the fiber needs to be placed within about 1 mm of the end of the ferrule (+/−0.5 mm). This may be accomplished, for example, by creating a fixture for assembling the connector that stops the fiber at the appropriate location, or by building a stop into the connector, or by relying on the fiber to touch the plastic lens of the SFP itself. This allows the position of the end of the fiber to be controlled in the direction along the fiber. The left side of FIG. 2B shows a fiber clamp 220 clamped onto a protrusion 202 such that a fiber 210 is securely held in place.

In a standard field-terminated connector, such as the LC connectors 104 used in connector assembly 100 depicted in FIGS. 1A-1C, there is a short piece of glass fiber (i.e., a "stub"), that is polished at the connector face and then cleaved inside the connector in a precision plastic v groove. A small amount of index matching gel is placed between the fiber stub in the connector and a fiber input into the connector to reduce loss and minimize reflections. In connector assembly 200 depicted in FIGS. 2A-2B, on the other hand, a bare portion of fiber is run to the output end of the fiber ferrule of the connector assembly, which avoids the use of the short, polished fiber stub. Thus, connector assembly 200 is particularly suitable for applications using fiber-to-air interfaces (such as encountered when connecting to a SFP type transceiver pair or equivalent device), since fiber-to-air interfaces are not as sensitive to the flatness or angle of the fiber end. Connector assembly 200 may also be used for fiber-to-fiber interfaces so long as the fiber is cleaved with sufficient flatness and a small cleave angle.

In a further embodiment, a combination of the structures shown in FIGS. 1A-1C and 2A-2B may be utilized. Specifically, this further embodiment provides a field-terminated LC connector assembly having a ceramic ferrule, a fiber stub, and a fiber-to-fiber connecting v-groove built into the fiber/wire connector format.

Figure 3A:
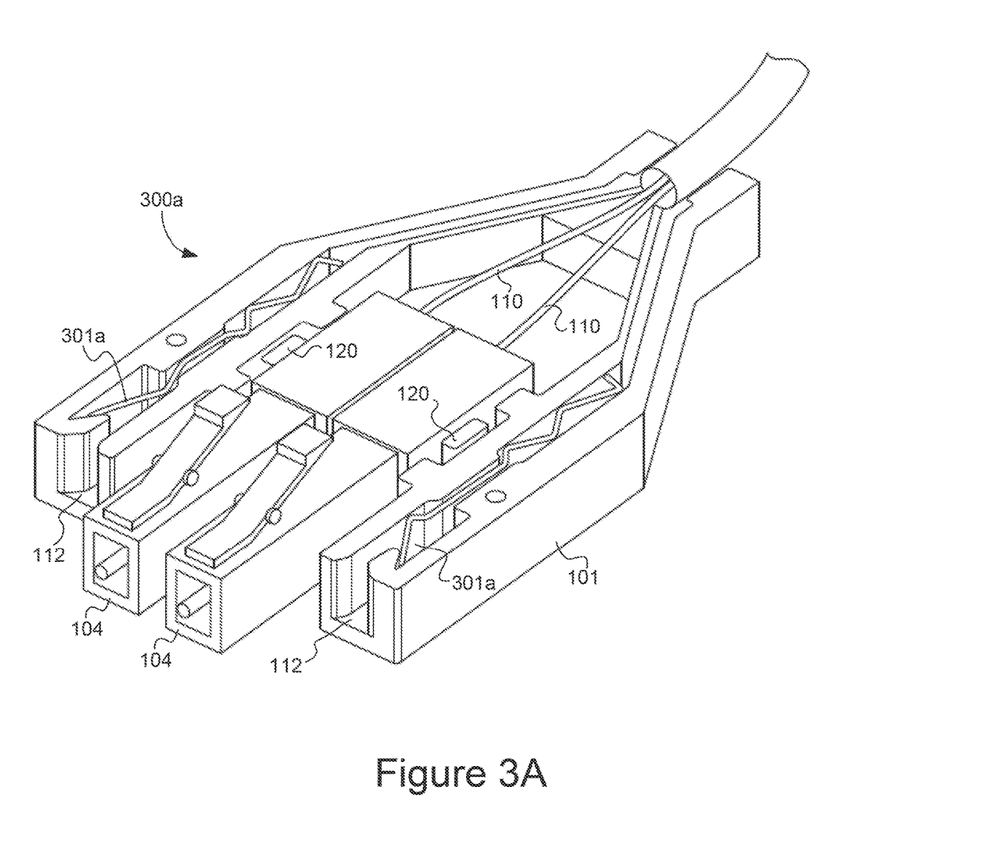
FIG. 3A is a schematic diagram illustrating another exemplary LC connector assembly utilizing discrete LC connectors.

FIG. 3A is a schematic diagram illustrating another exemplary LC connector assembly 300a utilizing discrete LC connectors (cover not shown). LC connector assembly 300a is similar to the LC connector assembly 100 depicted in FIGS. 1A-IC in that it also includes discrete LC connectors 104, base 101, support structures 120, fibers 110 from a hybrid cable, wires (not depicted) from a hybrid cable, and power sockets 112. LC connector assembly 300a further illustrates these components arranged in a different configuration, and additionally illustrates bent metal pieces 301a (a metal element having a beveled portion) disposed in each of the power sockets 112 for making a connection between an external device and the wires from the hybrid cable. The bent metal pieces 301a are flexible such that male connectors from an external device that are inserted into the power sockets 112 make contact with the bent metal pieces and cause the bent metal pieces to bend upwards and/or to the side.

Figure 3B:
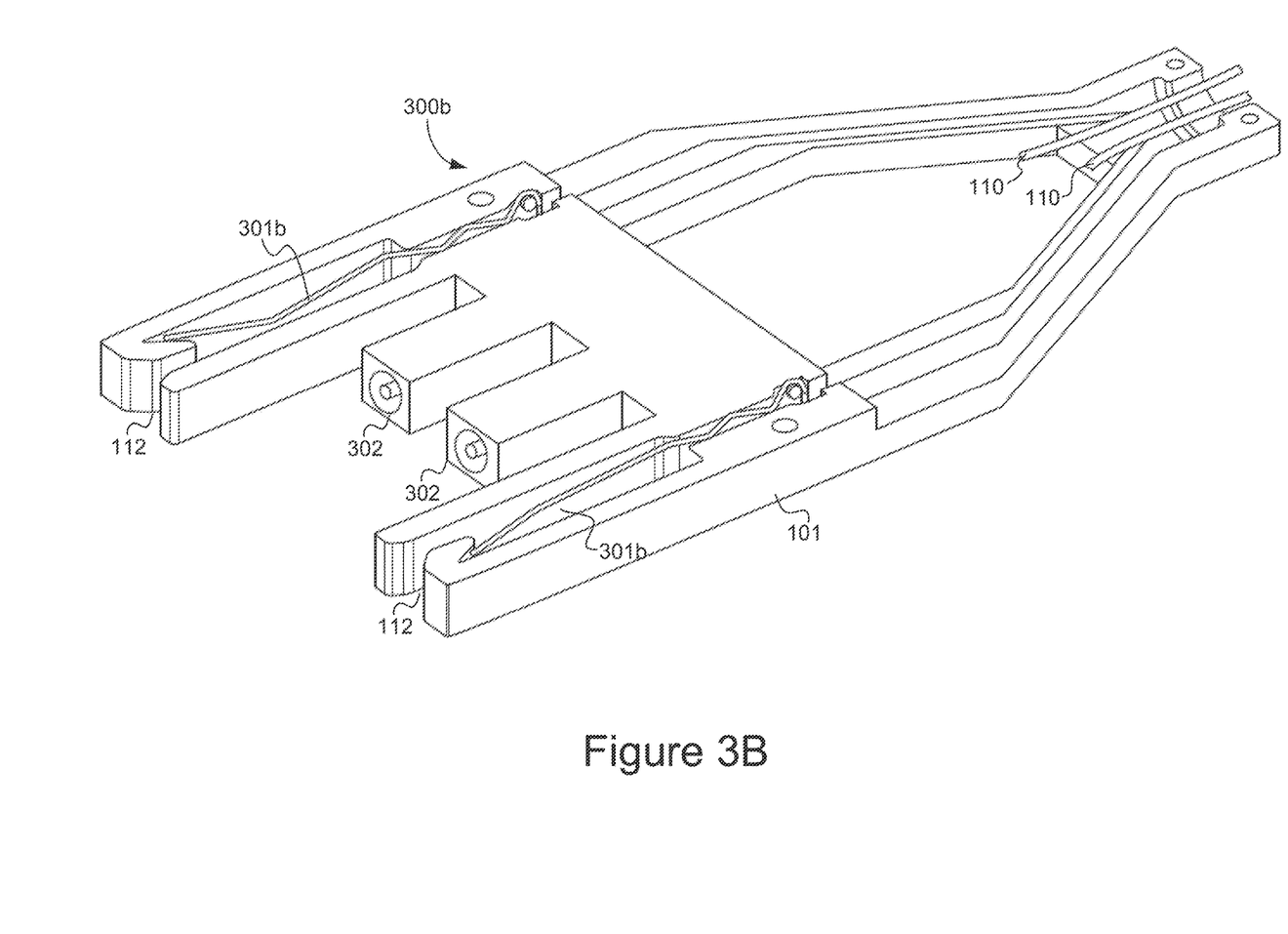
FIG. 3B is a schematic diagram illustrating another exemplary LC-compatible connector assembly utilizing integrated LC-compatible connectors.

FIG. 3B is a schematic diagram illustrating another exemplary LC-compatible connector assembly utilizing integrated LC-compatible connectors. LC connector assembly 300b is similar to the LC connector assembly 200 depicted in FIGS. 2A-2B in that it also includes base 101, fibers 110 (partially depicted) from a hybrid cable, wires (not depicted) from a hybrid cable, and power sockets 112. Further, like the LC connector assembly 300a of FIG. 3A, LC-compatible connector assembly 301b also includes bent metal pieces 301b disposed in each of the power sockets 112 for making a connection between an external device and the wires from the hybrid cable.

Additionally, the LC-compatible connector assembly 301b of FIG. 3B has a one-piece ferrule integrated into base 101 as LC-compatible protrusions 302 with a v-groove and fiber stub included, such that stripped portions of fibers 110 may be inserted into the LC-compatible protrusions 302.

FIGS. 4A-4D are schematic diagrams illustrating an exemplary SC connector assembly 400. The SC connector assembly 400 utilizes a standard SC connector 404 for terminating a fiber of a hybrid fiber/wire cable and power sockets 412 for terminating wires of a hybrid fiber/wire cable. In this example, connector assembly 400 includes a single SC type connector 404 with wire connections for power transmission. This single SC connector type arrangement is typically found in Passive Optical LAN (POL) or Passive Optical Network (PON) type architectures where communications in both directions are accommodated on a single fiber by way of two wavelength multiplexing (e.g., 1310 nm and 1550 nm).

Figure 4A:
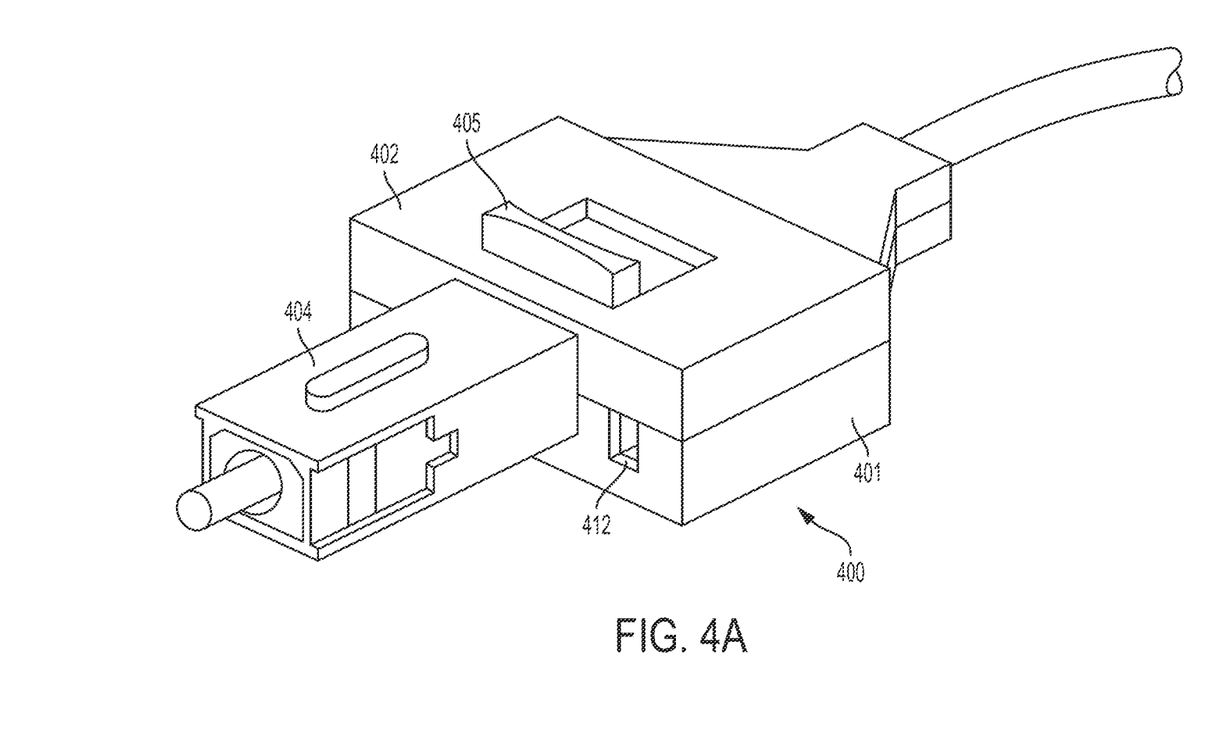
FIGS. 4A-4D are schematic diagrams illustrating an exemplary SC connector assembly utilizing a discrete SC connector.
Figure 4B:
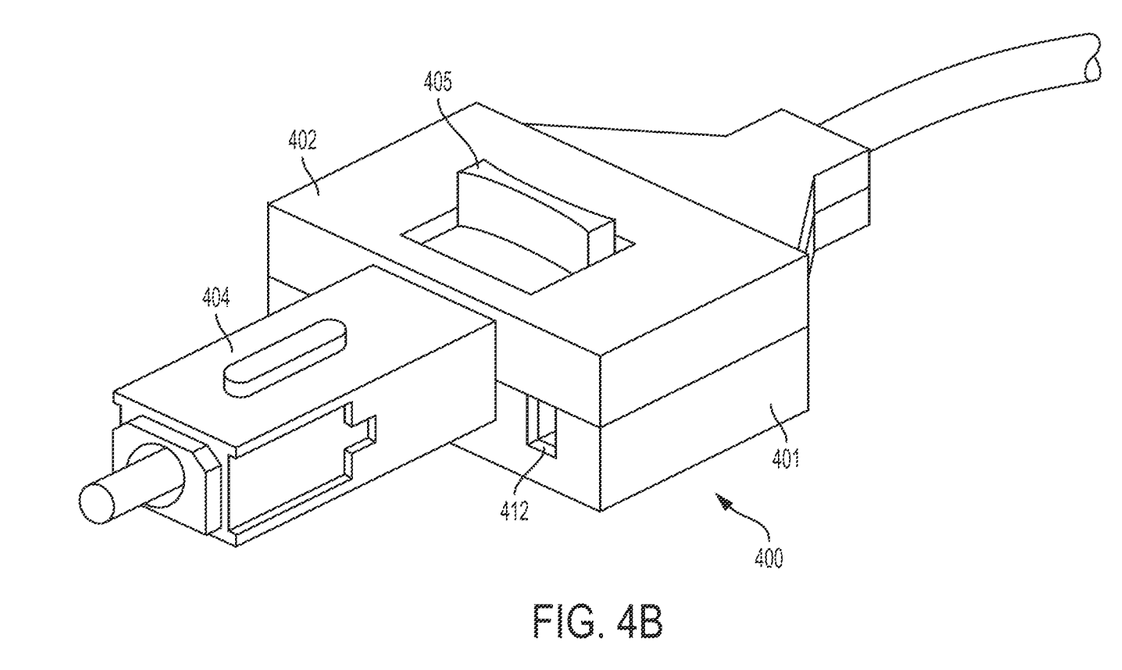

FIGS. 4A and 4B are schematic diagrams illustrating SC connector assembly 400 with cover 402 in an assembled position relative to base 401, with latch 405 protruding from the cover 402 in a latched position in FIG. 4A and an unlatched position in FIG. 4B. The latch 405 being in the unlatched position depicted in FIG. 4B facilitates release of SC connector assembly 400 from an SC receptacle such as a single SC-based passive optical network (PON) module (not shown in FIG. 4A), to allow for removal of the SC connector assembly 400 from the corresponding receptacle. In FIG. 4A, the latch 405 being in the latched position facilitates the SC connector assembly being securely attached to a corresponding SC receptacle. In the latched position, a fiber carrier portion of the SC connector 404 is flush with a body of the SC connector 404, while in the unlatched position, the body of the SC connector 404 is retracted relative to the front of the fiber carrier portion of the SC connector 404.

Figure 4C:
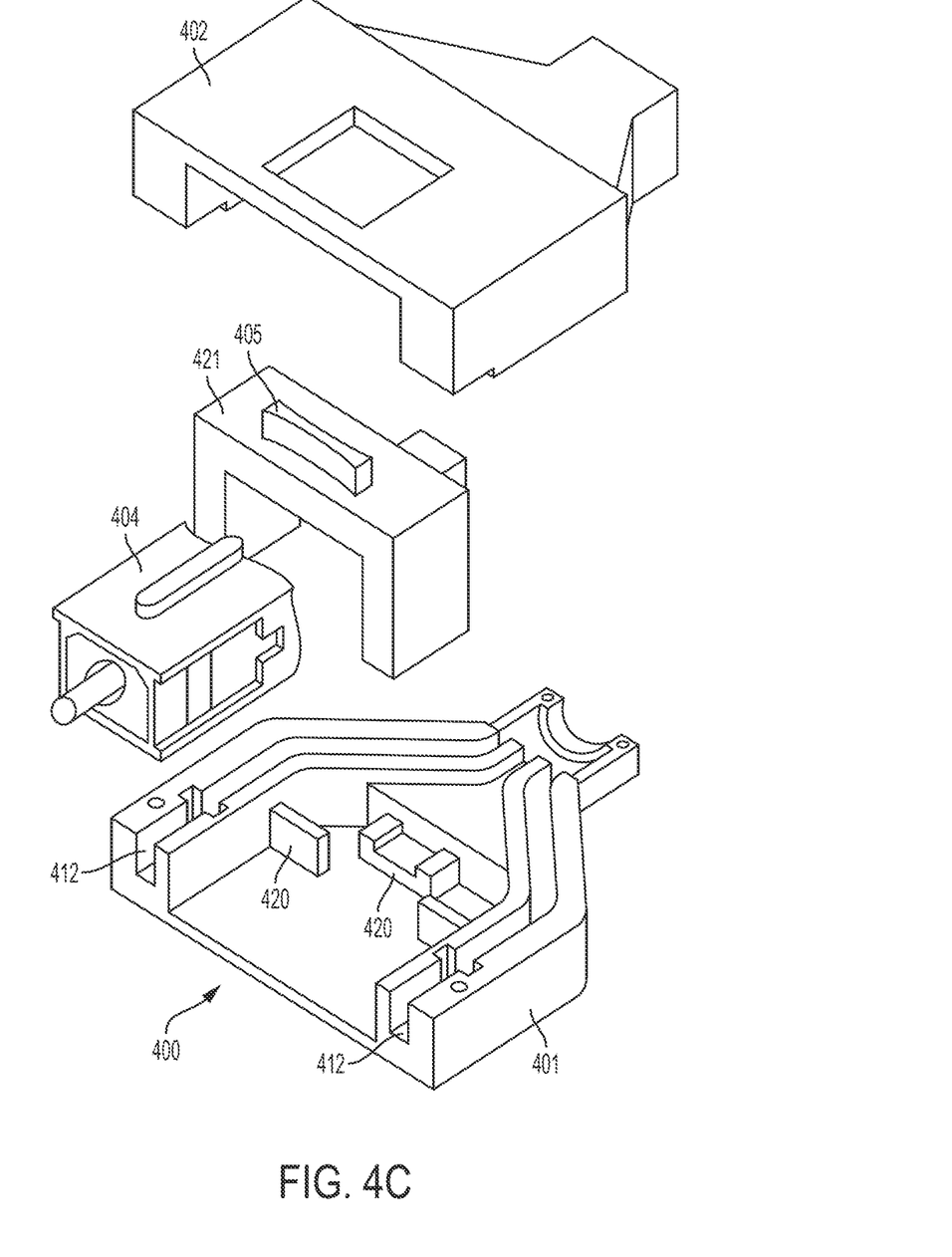

FIG. 4C is a schematic diagram illustrating an expanded view of SC connector assembly 400. In this example, the cover 402 is raised to show how the SC connector 404 fits within SC connector assembly 400. Support structures 420 that are built into or attached to base 401 are configured to securely hold the SC connector 404 in place, and the latch 405 is part of an actuator element 421 that interfaces with a corresponding latching element of the SC connector 404 such that actuating the latch 405 causes a corresponding latch of the SC connector 404 to be actuated. Power sockets 412 are provided in the base 401 on either side of the connector assembly, and wires are routed towards the neck of the SC connector assembly 400 through respective pathways (e.g., grooves) along the outside of the base 401, whereas fiber from the SC connector 404 is routed towards the neck of the SC connector assembly 400 through respective pathways as well (not shown). In an example, the fiber of the hybrid fiber/wire cable is terminated into the SC connector 404 after cleaving the fiber to an appropriate length, and the wires 411 and terminated into power sockets 412 as well. A strain relief (not shown) may further be placed over the ferrule end of SC connector assembly 400 to secure the hybrid fiber/wire cable in place.

Figure 4D:
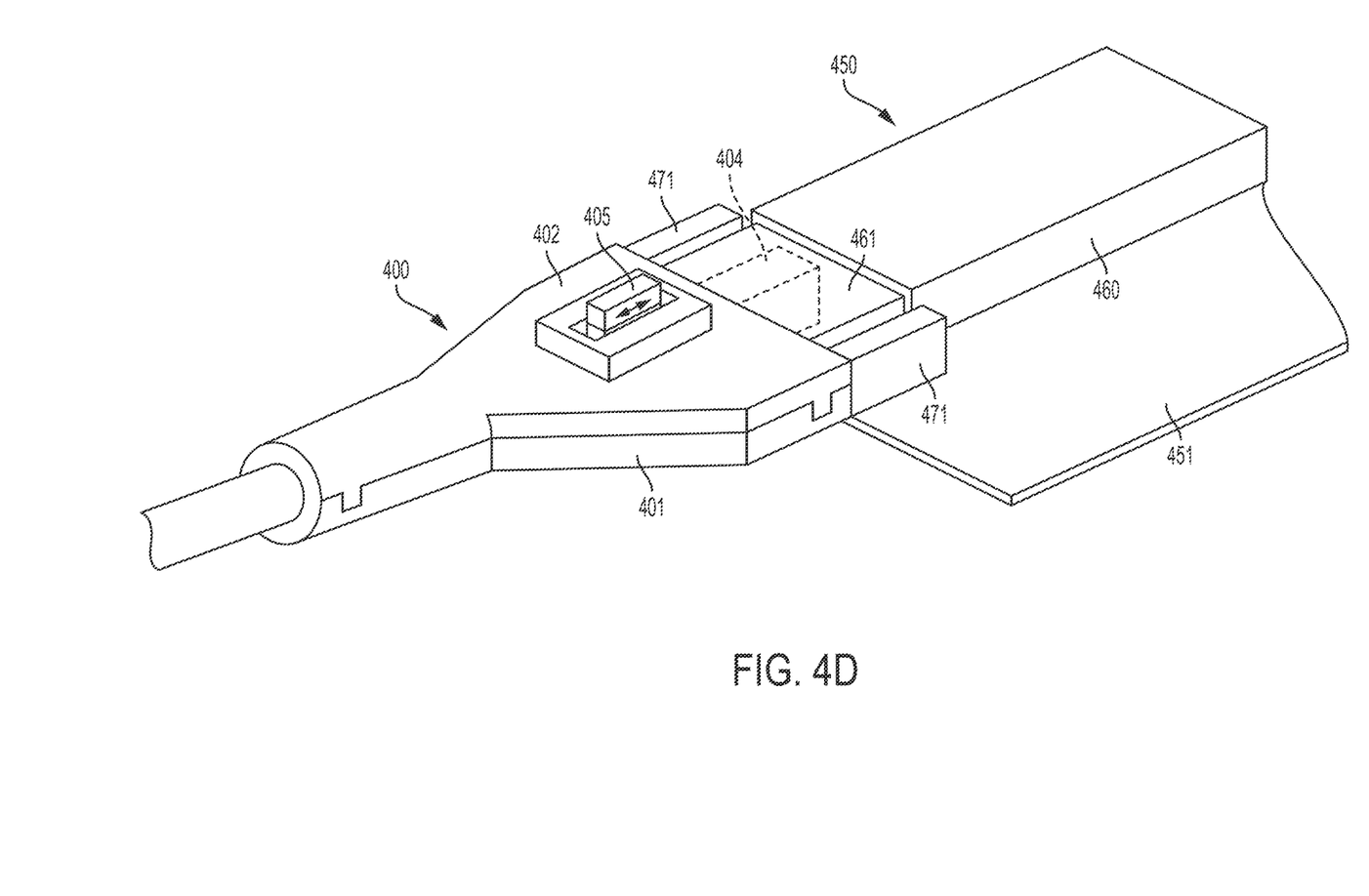

FIG. 4D is a schematic diagram illustrating an exemplary environment in which SC connector assembly 400 is depicted being connected to a device 450. Device 450 includes a printed circuit board (PCB) 451. An SFP cage 460 on PCB 451 having a PON type SFP socket for a single SC connector 461 is configured to interface with SC connector 404 of the connector assembly 400 to provide data communications, while contact blades disposed in contact blade housings 471 on PCB 451 are configured to interface with power sockets of the connector assembly 400 to provide power transmission. The contact blades (which, for example, may be male electrical connectors mounted on the PCB 451), may be connected to the rest of device 450 through electrically conductive traces on the PCB 451.

In further exemplary embodiments, parts or all of the discrete SC connector 404 may be replaced by integrating such parts into base 401. For example, similar to how FIGS. 2A-2B and FIG. 3B depict exemplary embodiments where the discrete LC connectors 104 from FIGS. 1A-1C are replaced with integrated components of the housing, the SC connector assembly 400 may also be modified to allow a portion of bare fiber to be run through such that the SC connector assembly 400 is still able to interface with SC-compatible SFP modules while the polished fiber stub used in standard discrete SC connectors is not used.

It will be appreciated that all of the foregoing embodiments are exemplary, and that the features thereof may be used in a variety of different embodiments relating to LC-compatible interfaces, SC-compatible interfaces, as well as interfaces involving other types of connectors. For example, other standard types of fiber connectors include ST, FC, MTRJ, MTO, and Diamond connectors, and suitable connector assemblies may be provided for those connector types based on the principles discussed herein. There may also be further types of hybrid optical and electrical cable connections that do not adhere to any established standard where these principles may be applicable.

It will further be appreciated that the arrangement of components within a connector assembly is not limited to the exemplary embodiments discussed herein, and in other embodiments may be arranged in different ways. For example, the fiber connectors need not be side by side, and in other examples may be positioned one above the other, or in other configurations, depending on the needs of the application.

Additionally, the mechanical relationships between the optical fiber and the electrical wires may be arranged in various manners. In one example, the arrangement of the components provides for electrical shielding around the SFP module.

It will be appreciated that the exemplary embodiments discussed herein may be connected to a variety of devices so long as the devices are provided with appropriate sockets/connectors for interfacing with the connector assembly. In one example, a connector assembly may be plugged into an interface device between a hybrid fiber/wire cable and a client device. In another example, the connector assembly may be plugged into a box embedded in a wall, the box being adapted to receive the connector assembly. The box may also be connected to a wall plate attached a wall. The box may further include a media converter, and the wall plate may include a standard opening to receive a Category (e.g., Cat 5, 6, 7 etc.) cable. In yet another example, the wall plate to which the box and connector assembly are attached may include a standard opening to receive USB Type-C cable.

It will be appreciated that the exemplary embodiments discussed herein may be applied with respect to either multimode or single mode optical fibers.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A connector assembly for a hybrid cable, the connector assembly comprising:
   a housing, comprising a base and a cover, wherein the base corresponds to an entire bottom surface of the housing and is formed of a single mold;
   a discrete SC connector mounted onto the base and protruding from the housing, the discrete SC connector being configured to receive a fiber from the hybrid cable, wherein the fiber is cleaved and terminated into the discrete SC connector; and
   two electrical interfaces, wherein each electrical interface is configured to receive a respective wire from the hybrid cable, and wherein the two electrical interfaces are disposed on opposite sides of the discrete SC connector.

2. The connector assembly according to claim 1, further comprising:
   a latch for actuating the discrete SC connector between a first configuration and a second configuration.

3. The connector assembly according to claim 1, wherein the discrete SC connector is mounted in the base via one or more support structures.

4. The connector assembly according to claim 1, wherein each electrical interface includes a power socket.

5. The connector assembly according to claim 4, wherein each electrical interface further includes a respective bent metal piece disposed in the respective power socket.

6. The connector assembly according to claim 1, wherein the cover is configured to snap onto the base.

7. The connector assembly according to claim 1, further comprising:
   a strain relief rubber boot through which a sheathed portion of the hybrid cable is run.

8. A connector assembly for a hybrid cable, comprising:
   a housing adapted to accept the hybrid cable, the housing comprising multiple pathways;
   wherein the multiple pathways include a first pathway configured to receive a cleaved fiber of the hybrid cable and a second pathway configured to receive at least one wire of the hybrid cable;
   wherein the first pathway further includes a discrete SC connector mounted in a base of the housing, wherein the discrete SC connector is configured to receive the cleaved fiber of the hybrid cable, and wherein the base corresponds to an entire bottom surface of the housing and is formed of a single mold;
   wherein the second pathway comprises two electrical interfaces, wherein each electrical interface is configured to receive a respective wire from the hybrid cable, and wherein the two electrical interfaces are disposed on opposite sides of the discrete SC connector.

9. The connector assembly according to claim 8, further comprising:
   a latch for actuating the discrete SC connector between a first configuration and a second configuration.

10. The connector assembly according to claim 8, wherein each electrical interface includes a power socket.

11. The connector assembly according to claim 10, wherein each electrical interface further includes a respective bent metal piece disposed in the respective power socket.

12. The connector assembly according to claim 8, wherein the housing further comprises a cover configured to snap onto the base.

13. The connector assembly according to claim 8, further comprising:
   a strain relief rubber boot through which a sheathed portion of the hybrid cable is run.

* * * * *